(12) United States Patent
Imai

(10) Patent No.: US 7,066,209 B2
(45) Date of Patent: Jun. 27, 2006

(54) THREAD PROTECTOR

(75) Inventor: Ryuichi Imai, Osaka (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 11/107,825

(22) Filed: Apr. 18, 2005

(65) Prior Publication Data

US 2005/0242587 A1    Nov. 3, 2005

(30) Foreign Application Priority Data

Apr. 27, 2004    (JP)    ............................. 2004-132096

(51) Int. Cl.
*B65D 59/06*    (2006.01)

(52) U.S. Cl. ................... 138/96 T; 138/96 R; 285/333

(58) Field of Classification Search .............. 138/96 T, 138/96 R; 285/55, 333, 334

See application file for complete search history.

(56) References Cited

U.S. PATENT DOCUMENTS 1,776,528 A  *  9/1930  Unke ........................ 138/96 T
2,900,435 A  *  8/1959  Curtiss ........................ 174/83
4,809,752 A  *  3/1989  Strodter .................... 138/96 T

FOREIGN PATENT DOCUMENTS

JP          09-072467        3/1997
JP          2001-065752      3/2001
JP          2001-199469      7/2001

* cited by examiner

*Primary Examiner*—Patrick Brinson

(74) *Attorney, Agent, or Firm*—Clark & Brody

(57) ABSTRACT

In a protector for protecting a trapezoidal female thread of a pipe formed to an end thereof, the protector has a male thread formed thereto so as to be threaded with the female thread as well as the height of the thread of the male thread is made larger than the height of the thread of the female thread. With this arrangement, a surface treatment applied to the surface of the female thread or a male thread formed to the end of the pipe can be prevented from being damaged, and in particular, a surface treatment applied to a guide flank surface, a load flank surface, a corner portion, and the like of the thread can be prevented from being subjected to wear, damage, and the like.

12 Claims, 7 Drawing Sheets

THREAD PROTECTOR

BACKGROUND OF THE INVENTION

1. Field of the Invention

The present invention relates to a thread protector for use with a pipe, and more particularly, to a thread protector for protecting a male thread or a female thread formed to an end of the pipe.

2. Description of the Related Art

Ordinarily, oil well pipes used in oil fields and the like must have a length of several thousand meters. Such a long oil well pipe is formed by coupling pipes each having a male thread or a female thread formed to the ends thereof. The coupling portion of the thread is required to keep gas tightness even if external force applied to the pipe, and pressure, heat, and the like from the inside of the pipe act on the coupling portion and is further required not to be deformed and broken thereby.

When the male thread of a pipe is tightened to the female thread of another pipe in the coupling portion thereof, if the threads are composed of trapezoidal threads, they are tightened in the following two states depending on a facility in which the pipes are used.

As shown in FIG. 7, in a first state, a male thread 3b and a female thread 3a of two pipes are tightened to each other with the guide flank surfaces (stub flank surfaces) 16b and 16a thereof in contact with each other. In this state, on the female thread 3a side, the guide flank surface 16a and the top surface (crest surface) 12a thereof are subjected to friction under the bearing stress of the male thread 3b. Further, on the male thread 3b side, the guide flank surface 16b and the bottom surface (root surface) 14b thereof are subjected to friction under the bearing stress of the female thread 3a.

As shown in FIG. 8, in a second state, a male thread 3b and a female thread 3a of two pipes are tightened to each other with the load flank surfaces 18b and 18a thereof in contact with each other. In this state, on the female thread 3a side, the load flank surface 18a and the top surface 12a of the female thread 3a are subjected to friction under the bearing stress of the male thread 3b. Further, on the male thread 3b side, the load flank surface 18b and the bottom surface 14b thereof are subjected to friction under the bearing stress of the female thread 3a.

Further, when the male thread 3b is centered to the female thread 3a before they are tightened with each other, the corner portions formed by the guide flank surfaces 16b and 16a and the top surfaces 12b and 12a of the male and female threads 3b and 3a may collide with each other as shown in FIG. 9.

Conventionally, the friction of the flank surfaces, and the like and the collision of the corner portions in the above states in which the threads are tightened are coped with using grease. That is, grease is applied to the thread portions of pipes to suppress the metal surfaces of a male thread and a female thread from coming in contact with each other and further reduces friction when the threads are tightened to each other by the lubrication effect of the grease, thereby the damage and galling (seizing) of thread surfaces are prevented.

However, since grease often contains heavy metals and has a bad decomposing property in the oceans, there have been recently proposed methods of eliminating the use of grease by providing a thread surface with a lubricating property by subjecting a thread to a surface treatment from a view point of preventing environmental pollution and further because of a reason that when a protector is removed in deserts from a pipe having a thread to which grease is applied, sands adhere to the grease and make it difficult to normally tighten the thread.

As a method of eliminating the use of grease, Japanese Patent Application Laid-Open (JP-A) No. 9-72467 discloses a thread joint excellent in a galling resistant property in a non-lubricating state in which neither grease nor a liquid lubricant is used by providing an irregular portion on a thread surface, forming a resin film layer, and flattening the surface of the irregular portion with the resin film layer. Further, JP-A No. 2001-65752 discloses a thread joint for an oil well pipe in which a lubrication film composed of an inorganic polymer compound is formed on the contact portion of the thread joint.

However, these methods of eliminating the use of grease are disadvantageous in that when threads are tightened, since the surfaces of the threads come into direct contact with each other, surface treatment layers formed on the guide flank surfaces, the load flank surfaces, the corner portions, and the like are particularly liable to be subjected to wear and damage.

Further, a pipe having a male thread or a female thread formed to an end thereof has a protector attached to the end to protect the thread or to prevent foreign materials such as sands and the like from entering the pipe. The protector has a thread to be threaded with a male thread or a female thread formed to an end of the pipe, and the protector is rotated on the male thread or in the female thread and attached to the pipe to protect it.

In view of the problem that the surface treatment applied to the specific portions described above is particularly subjected to wear and the like, the protector for protecting the thread is required not to damage the surface treatment of the specific portions. Further, it is preferable to design the protector such that it is not in contact with the specific portions.

JP-A No. 2001-199469 discloses a pipe end protector in which the groove width and the height of a thread portion are prescribed within predetermined ranges as a protector whose structure is prescribed.

However, an object of the invention of JP-A No. 2001-199469 is to optimize the gap between a thread portion formed to a pipe end and a thread portion of the pipe end protector to thereby effectively prevent an untirust agent filling the gap from flowing out without deteriorating workability in tightening and loosing. As described above, the invention disclosed in JP-A No. 2001-199469 uses grease (untirust agent) as a precondition, and the reason for restricting the thread shape of the protector does not intend to protect the surface treatment of the thread portion of the pipe and thus does not satisfy the above requirement.

SUMMARY OF THE INVENTION

Accordingly, an object of the present invention is to provide a thread protector capable of preventing the damage of a surface treatment layer applied to the surface of a male thread or a female thread formed to an end of a pipe and particularly capable of preventing surface treatment layers applied to a guide flank surface, a load flank surface, a corner portion, and the like from being subjected to wear, damage, and the like.

The present invention will be explained below with reference to the accompanying figures. However, the components used in the present invention are not limited to the configurations of components shown in the figures together with reference numerals.

In view of the above problems, the present inventors have found that when a thread joint using no grease is protected by a protector, the portions of the protector, in which the prevention of the damage of the thread surfaces of the portions is important and the damage thereof must be prevented are limited. The inventors have completed the present invention by positively changing the thread shapes of the protector to protect the limited portions.

A first aspect of the present invention is a female thread protector for use with a pipe joint to protect a trapezoidal female thread formed to an end of the pipe including a male thread to be threaded into the female thread, wherein the height of the thread of the male thread is larger than the height of the thread of the female thread.

In the first aspect of the present invention, the guide flank surface of the male thread is preferably arranged such that, when the protector is attached to the pipe joint, the gap between the guide flank surface of the male thread and the guide flank surface of the female thread increases toward the top surface of the female thread.

In the first aspect of the present invention, the load flank surface of the male thread is preferably arranged such that, when the protector is attached to the pipe joint, the gap between the load flank surface of the male thread and the load flank surface of the female thread increases toward the top surface of the female thread.

A second aspect of the present invention is a male thread protector for use with a pipe joint to protect a trapezoidal male thread formed to an end of the pipe including a female thread to be threaded onto the male thread, wherein the height of the thread of the female thread is smaller than the height of the thread of the male thread.

In the second aspect of the present invention, the guide flank surface of the female thread is preferably arranged such that, when the protector is attached to the pipe joint, the gap between the guide flank surface of the female thread and the guide flank surface of the male thread increases toward the top surface of the male thread.

In the second aspect of the present invention, the load flank surface of the female thread is preferably arranged such that, when the protector is attached to the pipe joint, the gap between the load flank surface of the female thread and the load flank surface of the male thread increases toward the top surface of the male thread.

In the second aspect of the present invention, the bottom surface of the female thread is preferably arranged such that, when the protector is attached to the pipe joint, the gap between the bottom surface of the female thread and the top surface of the male thread increases from the load flank surface toward the guide flank surface.

A third aspect of the present invention is a pipe having a female thread protector or a male thread protector for use with a pipe joint according to the first aspect or the second aspect of the present invention.

A surface treatment layer applied to the male thread or the female thread formed to the end of the pipe before it is coupled can be prevented from being subjected to wear, damage, and the like by using the thread protector of the present invention. Accordingly, when pipes are coupled with each other, damages such as galling and the like of the pipes can be prevented by wearing of the thread portion without using grease in a coupling portion.

DESCRIPTION OF THE PREFERRED EMBODIMENTS

The present invention will be explained based on an embodiment shown in the figures.

(1) Female Thread Protector

Figure 1:
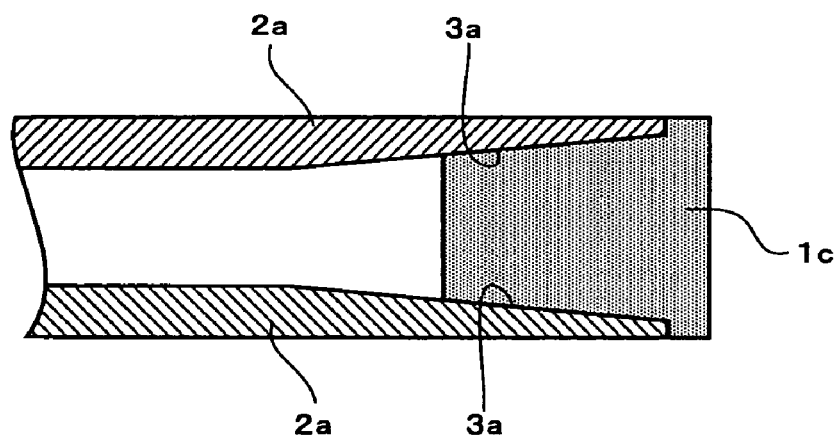
FIG. 1 is a view explaining the state in which a female thread protector is attached to a female thread.

As shown in FIG. 1, a pipe 2a, which is protected by a female thread protector 1c of the present invention, has a female thread 3a formed to an end thereof. The inner peripheral surface of the end of the pipe 2a, to which the female thread 3a is formed, is formed in a taper shape in the embodiment. In the present invention, the shape of the inner peripheral surface may be parallel to the axial center of the pipe 2a, and the female thread protector 1c of the present invention is formed in conformity with the shape of inner peripheral surface.

Figure 2:
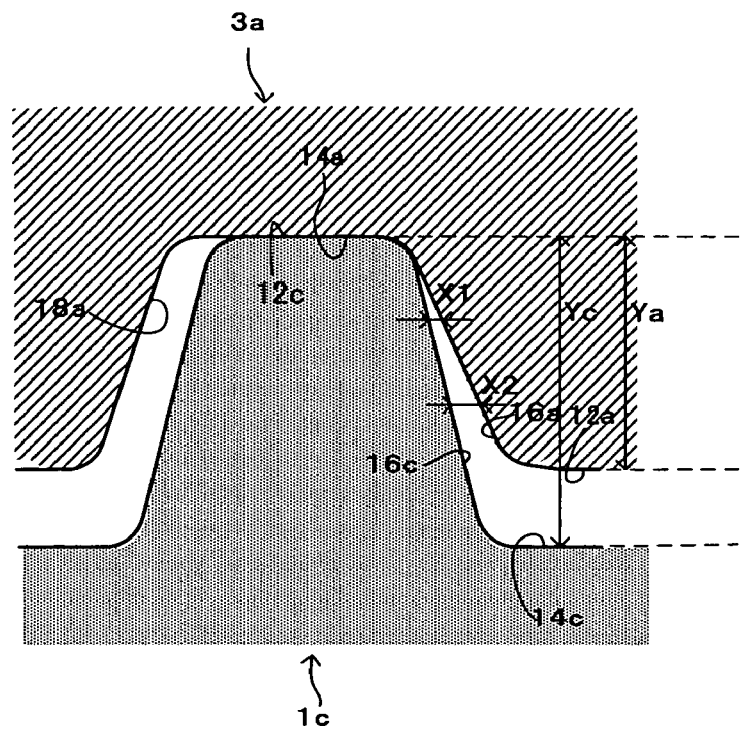
FIG. 2 is a view explaining the state of a thread portion when the female thread protector is tightened to the female thread.

The female thread 3a to be protected by the female thread protector 1c of the present invention is composed of a trapezoidal thread. The trapezoidal thread is a thread having a trapezoidal thread as shown in FIG. 2 and used when pipes must by strongly coupled with each other as in the case where oil well pipes and the like are coupled with each other. The trapezoidal thread has an top surface 12a and a bottom surface 14a, which are formed approximately parallel to the axial direction of a pipe, and a guide flank surface 16a and a load flank surface 18a which connect the top surface 12a to the bottom surface 14a. The inclination of the guide flank surface 16a is formed gentler than that of the load flank surface 18a.

Figure 3:
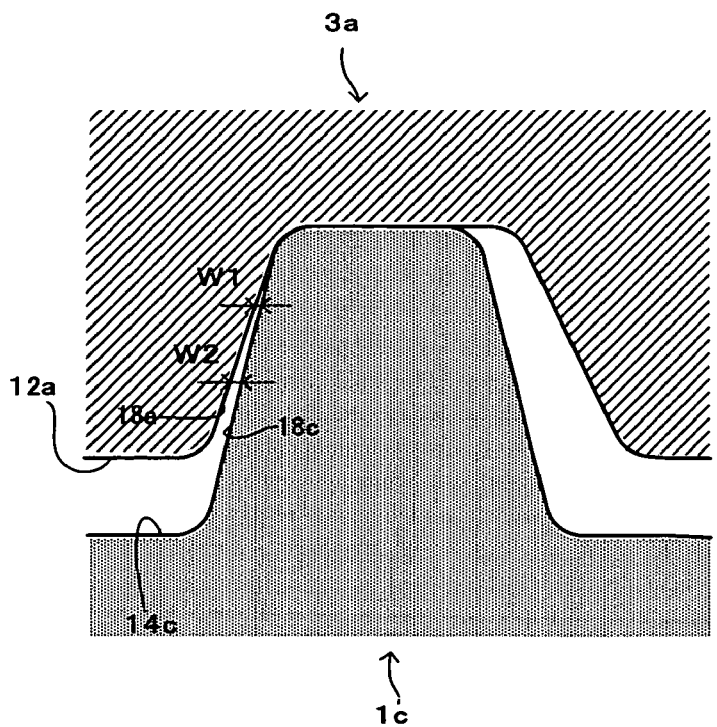
FIG. 3 is a view explaining the state of the thread portion when the female thread protector is loosened and removed from the female thread.

According to the female thread protector 1c of the present invention, a thread portion is formed around the outer peripheral surface thereof such that the thread portion is threaded with a trapezoidal thread formed to the female thread 3a. FIGS. 2 and 3 are enlarged explanatory views showing the state of the thread portion in the state in which the protector 1c is attached to the female thread 3a.

Figure 7:
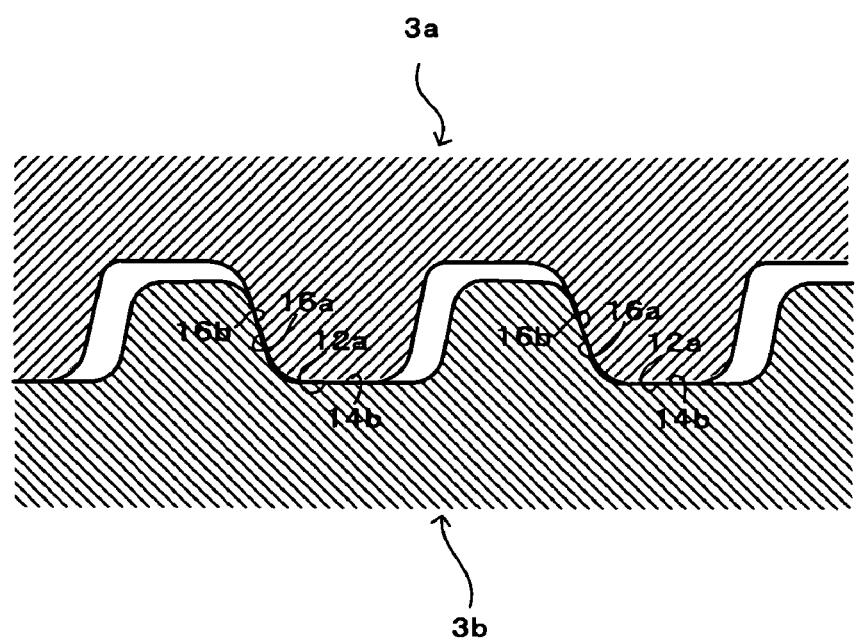
FIG. 7 is a view explaining the state of the male thread and the female thread when the male thread is tightened to the female thread with the guide flank surfaces thereof are in contact with each other.
Figure 8:
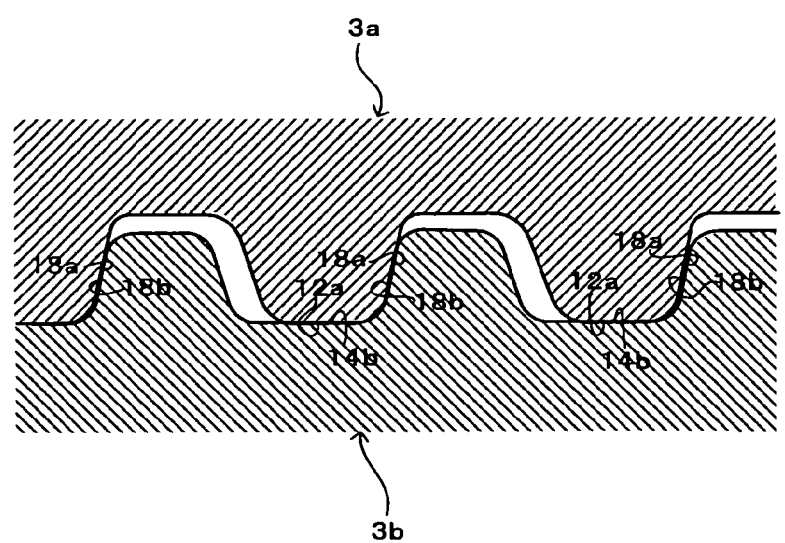
FIG. 8 is a view explaining the state of the male thread and the female thread when the male thread is tightened to the female thread with the load flank surfaces thereof are in contact with each other.

As shown in FIG. 2, in the female thread protector 1c of the present invention, the height Yc of the thread of the male thread formed around the outer periphery thereof is formed larger than the height Ya of the thread of the female thread 3a. The value of Yc/Ya is preferably 1.05 to 1.5 and more preferably 1.1 to 1.2. As shown in FIGS. 7 and 8, since the top surface 12a of the female thread 3a is in contact with the bottom surface 14b of the male thread 3b at all times, it is damaged rapidly. Accordingly, when the protector 1c is attached to the female thread 3a, the top surface 12c of the protector 1c is in contact with the bottom surface 14a of the female thread 3a, and the top surface 12a of the female thread 3a is not in contact with the bottom surface 14c of the protector 1c by making the height Yc of the thread of the protector 1c larger than the height Ya of the thread of the female thread 3a. With this arrangement, the surface treatment layer of the top surface 12a of the female thread 3a can be prevented from being damaged.

Further, as shown in FIG. 2, it is preferable that the shape of the guide flank surface 16c in a thread portion formed to the female thread protector 1c of the present invention be not parallel to the shape of the guide flank surface 16a of the female thread 3a of the pipe 2a and that the gap between the flank surfaces increase toward the top surface 12a of the female thread 3a or the bottom surface 14c of the female thread protector 1c.

Here, the "guide flank surfaces 16" means the side surface 16c of the protector 1c and the side surface 16a of the female thread 3a which approach to each other when the protector 1c is rotated and screwed into the female thread 3a. Further, "the gap between the flank surfaces increases toward the top surface 12a of the female thread 3a or the bottom surface 14c of the female thread protector 1c" means, for example, that the gap X2 between the guide flank surfaces is larger than the gap X1 therebetween in FIG. 2.

As shown in FIG. 7, the guide flank surface 16a of the female thread 3a is damaged rapidly because it is in contact with the guide flank surface 16b of the male thread 3b at all times depending on a facility and a method using pipes. Accordingly, the contact of the guide flank surface 16c of the protector 1c with the guide flank surface 16a of the female thread 3a is minimized by forming the shape of the guide flank surface 16c as described above, thereby the surface treatment layer of the guide flank surface 16a of the female thread 3a can be prevented from being damaged.

Figure 9:
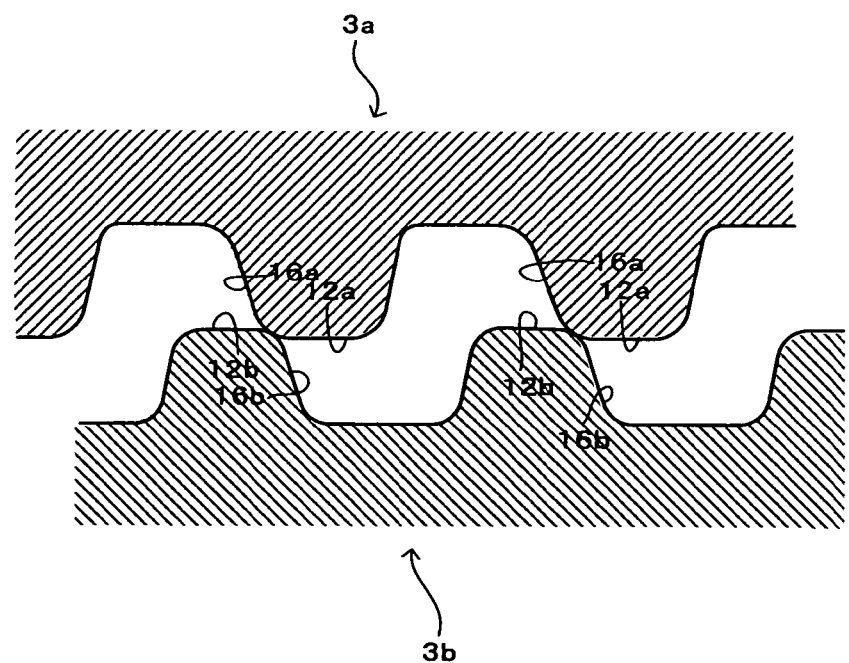
FIG. 9 is a view explaining the state of the male and female threads when they are centered to each other.

Further, as shown in FIG. 9, when the male thread 3b is centered to the female thread 3a before they are tightened to each other, the corner portions formed by the guide flank surfaces 16b and 16a and the top surfaces 12b and 12a of the male and female threads 3b and 3a may collide with each other. However, the collision of the corner portions can be prevented by prescribing the height Yc of the protector 1 and the shape of the guide flank surface 16c as described above, thereby the surface treatment layers of the corner portions can be prevented from being damaged.

Further, as shown in FIG. 3, it is preferable that the shape of the load flank surface 18c of the thread portion formed to the female thread protector 1c of the present invention be not parallel to the shape of a load flank surface 18a of the female thread 3a of the pipe 2a and that the gap between the flank surfaces increase toward the top surface 12a of the female thread 3a or the bottom surface 14c of the female thread protector 1c.

Here, the "load flank surfaces 18" means the side surface 18c of the protector 1c and the side surface 18a of the female thread 3a which approach to each other when the protector 1c is rotated and screwed out from the female thread 3a.

Further, "the gap between the flank surfaces increases toward the top surface 12a of the female thread 3a or the bottom surface 14c of the female thread protector 1c" means that the gap W2 between the load flank surfaces is larger than the gap W1 therebetween in FIG. 3.

As shown in FIG. 8, the load flank surface 18a of the female thread 3a is damaged rapidly because it is in contact with the load flank surface 18b of the male thread 3b at all times depending on a facility and a method using pipes. Accordingly, the contact of the load flank surface 18c of the protector 1c with the load flank surface 18a of the female thread 3a is minimized by forming the shape of the load flank surface 18c as described above, thereby the surface treatment layer of the load flank surface 18a of the female thread 3a can be prevented from being damaged.

(2) Male Thread Protector

Figure 4:
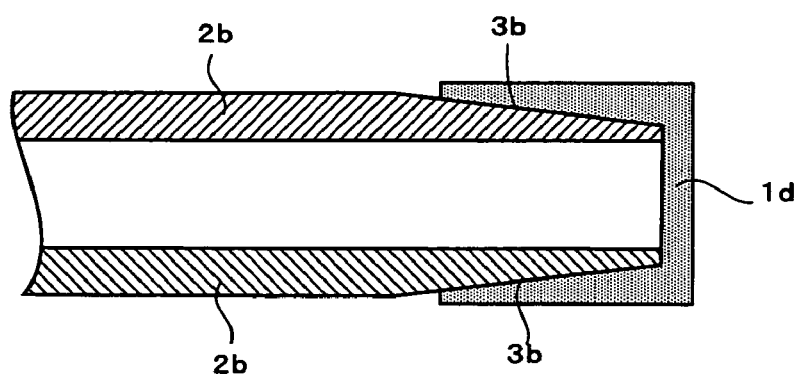
FIG. 4 is a view explaining the state in which a male thread protector is attached to a male thread.

As shown in FIG. 4, a pipe 2b, which is protected by a male thread protector 1d of the present invention, has a male thread 3b formed to an end thereof. The outer peripheral surface of the end of the pipe 2b, to which the male thread 3b is formed, is formed in a taper shape in the embodiment. In the present invention, the shape of the outer peripheral surface may be parallel to the axial center of the pipe 2b, and the female thread protector 1d of the present invention is formed in conformity with the shape of the outer peripheral surface. Likewise the female thread 3a described above, the male thread 3b to be protected by the male thread protector 1d of the present invention is composed of a trapezoidal thread.

Figure 5:
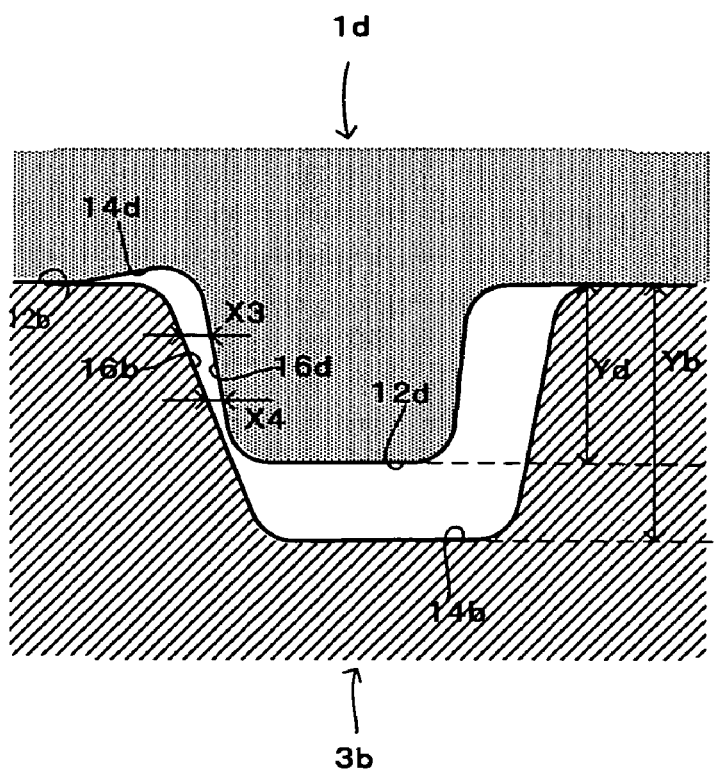
FIG. 5 is a view explaining the state of a thread portion when the male thread protector is tightened to the male thread.
Figure 6:
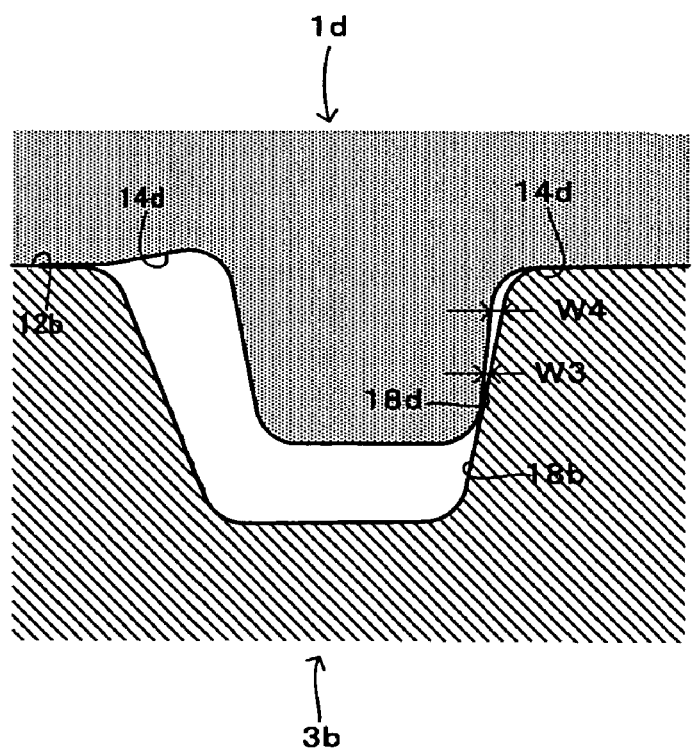
FIG. 6 is a view explaining the state of the thread portion when the male thread protector is loosened and removed from the male thread.

In the male thread protector 1d of the present invention, a female thread is cut around the inner peripheral surface of the protector 1d such that it is threaded with the trapezoidal male thread 3b. FIGS. 5 and 6 show enlarged sectional views of a thread portion in the state in which the protector 1d is attached to the male thread 3b.

As shown in FIG. 5, in the male thread protector 1d of the present invention, the height Yd of the thread of the thread portion, which is formed around the inner peripheral surface of the protector, is formed lower than the height Yb of the thread of the male thread 3b. The value of Yd/Yb is preferably 0.5 to 0.95 and more preferably 0.8 to 0.9.

As shown in FIGS. 7 and 8, the bottom surface 14b of the male thread 3b is rapidly damaged because it is in contact with the top surface 12a of the female thread 3a. Accordingly, when the protector 1d is attached to the male thread 3b, the bottom surface 14b of the protector 1d is in contact with the top surface 12b of the male thread 3b, and the bottom surface 14b of the male thread 3b is not in contact with the top surface 12d of the protector 1d by making the height Yd of the thread of the protector 1d lower than the height Yb of the thread of the male thread 3b. With this arrangement, the surface treatment layer of the bottom surface 14b of the male thread 3b can be prevented from being damaged.

Further, as shown in FIG. 5, it is preferable that the shape of the guide flank surface 16d of the thread portion formed to the male thread protector 1d of the present invention be not parallel to the shape of the guide flank surface 16b of the male thread 3b of the pipe 2b and that the gap between the flank surfaces increases toward the top surface 12b of the male thread 3b of the pipe 2b or the bottom surface 14d of the male thread protector 1d.

Here, the "guide flank surfaces 16" mean the side surface 16d of the protector 1d and the side surface 16b of the male thread 3b which approach to each other when the protector 1d is rotated and screwed onto the male thread 3b. Further, "the gap between the flank surfaces increases toward the top surface 12b of the male thread 3b of the pipe 2b or the bottom surface 14d of the male thread protector 1d" means, for example, that the gap X3 between the guide flank surfaces is larger than the gap X4 therebetween in FIG. 5.

As shown in FIG. 7, the guide flank surface 16b of the male thread 3b is damaged rapidly because it is in contact with the guide flank surface 16a of the female thread 3a at all times depending on a facility and a method using pipes. Accordingly, the contact of the guide flank surface 16d of the protector 1d with the guide flank surface 16b of the male thread 3b is minimized by forming the shape of the guide flank surface 16d as described above, thereby the surface treatment layer of the guide flank surface 16b of the male thread 3b can be prevented from being damaged.

Further, as shown in FIG. 6, it is preferable that the shape of the load flank surface 18d of the thread portion formed to the male thread protector 1d of the present invention be not parallel to the shape of the load flank surface 18b of the male thread 3b of the pipe 2b and that the gap between the flank surfaces increases toward the top surface 12b of the male thread 3b of the pipe 2b or the bottom surface 14d of the male thread protector 1d.

Here, the "load flank surfaces 18" mean the side surface 18d of the protector 1d and the side surface 18b of the male thread 3b which approach to each other when the protector 1d is rotated and screwed out from the male thread 3b. Further, "the gap between the flank surfaces increases toward the top surface 12b of the male thread 3b of the pipe 2b or the bottom surface 14d of the male thread protector 1d" means that the gap W4 between the load flank surfaces is larger than the gap W3 therebetween in FIG. 6.

As shown in FIG. 8, the load flank surface 18b of the male thread 3b is damaged rapidly because it is in contact with the load flank surface 18a of the female thread 3a at all times depending on a facility and a method using pipes. Accordingly, the contact of the load flank surface 18d of the protector 1d with the load flank surface 18b of the male thread 3b is minimized by forming the shape of the load flank surface 18d as described above, thereby the surface treatment layer of the load flank surface 18b of the male thread 3b can be prevented from being damaged.

Further, as shown in FIGS. 5 and 6, it is preferable that the shape of the bottom surface 14d of the thread portion formed to the male thread protector 1d of the present invention be not parallel to the shape of the top surface 12b of the male thread 3b of the pipe 2b and that the bottom surface 14d of the female thread 3a of the protector 1d be formed such that the gap between the bottom surface 14d and the top surface 12b of the male thread 3b of the pipe 2b increases from the load flank surface 18d toward the guide flank surface 16d.

Since the shapes of the guide flank surface 16d and the bottom surface 14d of the thread portion formed to the male thread protector 1d of the present invention are prescribed as described above, the protector 1d can be prevented from coming into contact with the corner portion which often comes into contact when the threads are centered to each other and is formed by the guide flank surface 16b and the top surface 12b of the male thread 3b. With the above arrangement, the surface treatment of the corner portion of the male thread 3b can be prevented from being damaged.

The present invention has been described as to the embodiment which is deemed most practical and preferable at present. However, the present invention is by no means limited to the embodiment disclosed in specification of the present invention and may be appropriately modified within a scope which does not depart from the gist and the technical idea of the present invention which can be read from the appended claims and the overall specification, and it must be understood that a male or female thread protector modified appropriately as described above is also included in the technical scope of the present invention.

What is claimed is:

1. female thread protector for use with a pipe joint to protect a trapezoidal female thread formed to an end of the pipe, the female thread protector comprising a male thread to be threaded into the female thread, wherein the height of the thread of the male thread is larger than the height of the thread of the female thread thereby preventing damage to a surface coating on the end of the pipe.

2. A female thread protector for use with a pipe joint according to claim 1, wherein a guide flank surface of the male thread is arranged such that, when the protector is attached to the pipe joint, a gap between the guide flank surface of the male thread and a guide flank surface of the female thread increases toward a top surface of the female thread.

3. A female thread protector for use with a pipe joint according to claim 1, wherein a load flank surface of the male thread is arranged such that, when the protector is attached to the pipe joint, a gap between the load flank surface of the male thread and a load flank surface of the female thread increases toward a top surface of the female thread.

4. A pipe having the female thread protector for use with a pipe joint according to claim 1 attached to an end thereof.

5. A male thread protector for use with a pipe joint to protect a trapezoidal male thread formed to an end of the pipe, the male thread protector comprising a female thread to be threaded onto the male thread, wherein the height of the thread of the female thread is smaller than the height of the thread of the male thread, wherein a guide flank surface of the female thread is arranged such that, when the protector is attached to the pipe joint, a gap between a guide flank surface of the female thread and the guide flank surface of the male thread increases toward a top surface of the male thread.

6. A male thread protector for use with a pipe joint to protect a trapezoidal male thread formed to an end of the pipe, the male thread protector comprising a female thread to be threaded onto the male thread, wherein the height of the thread of the female thread is smaller than the height of the thread of the male thread, wherein a load flank surface of the female thread is arranged such that, when the protector is attached to the pipe joint, a gap between the load flank surface of the female thread and a load flank surface of the male thread increases toward a top surface of the male thread.

7. A male thread protector for use with a pipe joint to protect a trapezoidal male thread formed to an end of the pipe, the male thread protector comprising a female thread to be threaded onto the male thread, wherein the height of the thread of the female thread is smaller than the height of the thread of the male thread, wherein a bottom surface of the female thread is arranged such that, when the protector is attached to the pipe joint, a gap between the bottom surface of the female thread and a top surface of the male thread increases from a load flank surface toward a guide flank surface.

8. A pipe having the female thread protector for use with a pipe joint according to claim 2 attached to an end thereof.

9. A pipe having the female thread protector for use with a pipe joint according to claim 3 attached to an end thereof.

10. A pipe having a male thread protector for use with a pipe joint according to claim 5 attached to an end thereof.

11. A pipe having a male thread protector for use with a pipe joint according to claim 6 attached to an end thereof.

12. A pipe having a male thread protector for use with a pipe joint according to claim 7 attached to an end thereof.

* * * * *